(12) United States Patent
Haataja

(10) Patent No.: US 6,592,792 B2
(45) Date of Patent: Jul. 15, 2003

(54) METHOD OF MAKING A STRANDBOARD MOLDING HAVING HOLES AT ANGLES OF 20 DEGREES TO VERTICAL OR MORE

(75) Inventor: Bruce A. Haataja, Lake Linden, MI (US)

(73) Assignee: Strandwood Molding, Inc., Hancock, MI (US)

( * ) Notice: Subject to any disclaimer, the term of this patent is extended or adjusted under 35 U.S.C. 154(b) by 0 days.

(21) Appl. No.: 09/847,259

(22) Filed: May 2, 2001

(65) Prior Publication Data

US 2001/0053428 A1 Dec. 20, 2001

Related U.S. Application Data

(60) Provisional application No. 60/201,350, filed on May 2, 2000.

(51) Int. Cl.⁷ ............................ B29B 11/14; B29C 51/42
(52) U.S. Cl. ................... 264/118; 264/119; 264/123; 264/155
(58) Field of Search .................. 264/109, 118, 264/119, 123, 155

(56) References Cited

U.S. PATENT DOCUMENTS

| | | |
|---|---|---|
| 3,164,511 A | 1/1965 | Elmendorf |
| 3,238,281 A | 3/1966 | Kato |
| 4,131,705 A | 12/1978 | Kubinsky |
| 4,213,928 A | 7/1980 | Casselbrant |
| 4,241,133 A | 12/1980 | Lund et al. |
| 4,246,310 A | 1/1981 | Hunt et al. |
| 4,248,163 A | 2/1981 | Caughey |
| 4,248,820 A | 2/1981 | Haataja |
| 4,337,710 A | 7/1982 | Haataja et al. |
| 4,384,019 A | 5/1983 | Haataja |
| 4,408,544 A | 10/1983 | Haataja |
| 4,440,708 A | 4/1984 | Haataja et al. |
| 4,469,216 A | 9/1984 | Haataja et al. |
| 4,790,966 A | 12/1988 | Sandberg et al. |
| 4,960,553 A | 10/1990 | DeBruine et al. |
| 5,385,754 A * | 1/1995 | Earl et al. .................. 427/221 |
| 6,368,544 B1 * | 4/2002 | Owens ....................... 264/463 |
| 6,451,235 B1 * | 9/2002 | Owens ........................ 264/86 |

* cited by examiner

Primary Examiner—Stephen J. Lechert, Jr.
(74) Attorney, Agent, or Firm—Price, Heneveld, Cooper, DeWitt & Litton

(57) ABSTRACT

Method of production of molded wood strand three-dimensionally curved articles of manufacture using at least one hole punch comprised of a base and a funnel shaped hole-defining portion having a funnel angle of 20 degrees or greater to vertical for producing molded holes at angles of 20 degrees or greater to vertical, to facilitate insertion of items such as a T nut within the molded hole in an assembly-line like fashion.

10 Claims, 3 Drawing Sheets

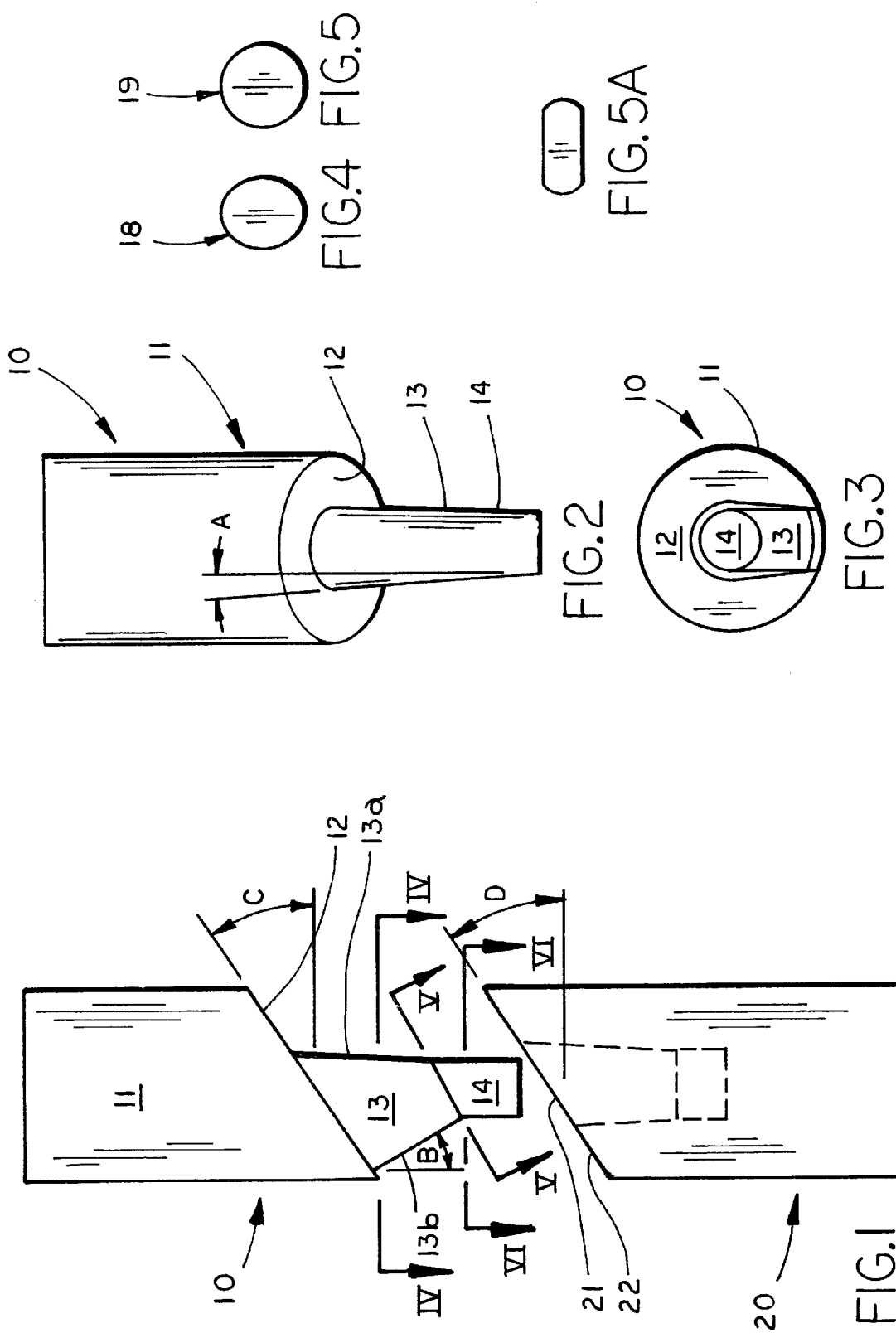

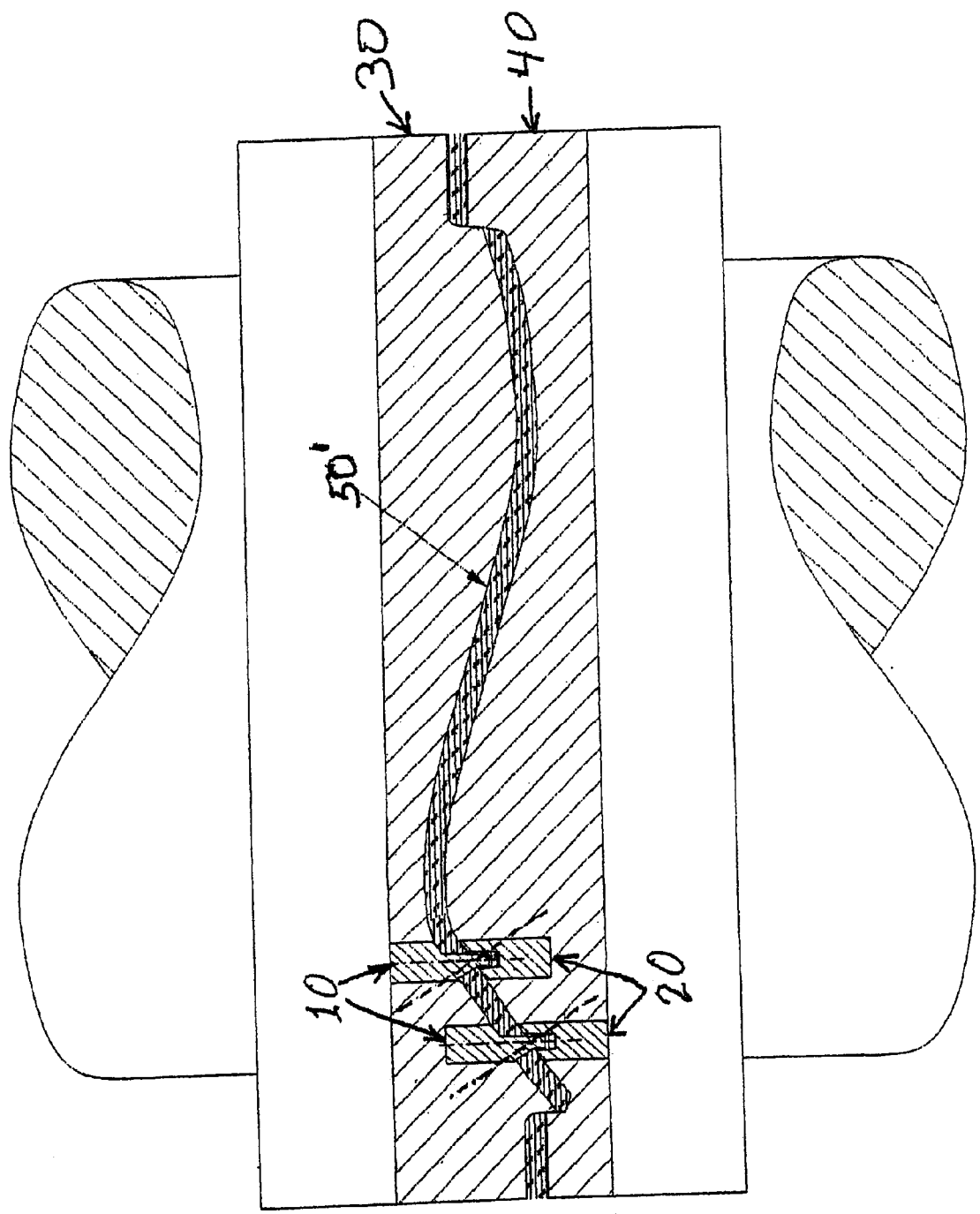

METHOD OF MAKING A STRANDBOARD MOLDING HAVING HOLES AT ANGLES OF 20 DEGREES TO VERTICAL OR MORE

CROSS-REFERENCE TO RELATED APPLICATION

The present invention claims priority to Provisional Patent Application No. 60/201,350, filed on May 2, 2000 entitled STRANDBOARD MOLDING HAVING HOLES AT ANGLES OF 20 DEGREES TO VERTICAL OR MORE.

BACKGROUND OF THE INVENTION

A. Field of the Invention

The present invention relates to the revolutionary wood flake molding technology invented by wood scientists at Michigan Technological University during the latter part of the 1970s.

B. Background of the Art

Wood flake molding, also referred to as wood strand molding, is a technique for molding three-dimensionally configured objects out of binder coated wood flakes having an average length of about 1¼ to about 6 inches, preferably about 2 to about 3 inches; an average thickness of about 0.005 to about 0.075 inches, preferably about 0.015 to about 0.030 inches; and an average width of 3 inches or less, most typically 0.25 to 1.0 inches, and never greater than the average length of the flakes. These flakes are sometimes referred to in the art as "wood strands." This technology is not to be confused with oriented strand board technology (see e.g., U.S. Pat. No. 3,164,511 to Elmendorf) wherein binder coated flakes or strands of wood are pressed into planar objects. In wood flake or wood strand molding, the flakes are molded into three-dimensional, i.e., non-planar, configurations.

In wood flake molding, flakes of wood having the dimensions outlined above are coated with MDI or similar binder and deposited onto a metal tray having one open side, in a loosely felted mat, to a thickness eight or nine times the desired thickness of the final part. The loosely felted mat is then covered with another metal tray, and the covered metal tray is used to carry the mat to a mold. (The terms "mold" and "die", as well as "mold die", are sometimes used interchangeably herein, reflecting the fact that "dies" are usually associated with stamping, and "molds" are associated with plastic molding, and molding of wood strands does not fit into either category.) The top metal tray is removed, and the bottom metal tray is then slid out from underneath the mat, to leave the loosely felted mat in position on the bottom half of the mold. The top half of the mold is then used to press the mat into the bottom half of the mold at a pressure of approximately 600 psi, and at an elevated temperature, to "set" (polymerize) the MDI binder, and to compress and adhere the compressed wood flakes into a final three-dimensional molded part. The excess perimeter of the loosely felted mat, that is, the portion extending beyond the mold cavity perimeter, is pinched off where the part defining the perimeter of the upper mold engages the part defining perimeter of the lower mold cavity. This is sometimes referred to as the pinch trim edge.

U.S. Pat. No. 4,440,708 and U.S. Pat. No. 4,469,216 disclose this technology. The drawings in U.S. Pat. No. 4,469,216 best illustrate the manner in which the wood flakes are deposited to form a loosely felted mat, though the metal trays are not shown. By loosely felted, it is meant that the wood flakes are simply lying one on top of the other in overlapping and interleaving fashion, without being bound together in any way. The binder coating is quite dry to the touch, such that there is no stickiness or adherence which hold them together in the loosely felted mat. The drawings of U.S. Pat. No. 4,440,708 best illustrate the manner in which a loosely felted mat is compressed by the mold halves into a three-dimensionally configured article (see FIGS. 2–7, for example).

This is a very unusual molding process as compared to a molding process one typically thinks of, in which some type of molten, semi-molten or other liquid material flows into and around mold parts. Wood flakes are not molten, are not contained in any type of molten or liquid carrier, and do not "flow" in any ordinary sense of the word. Hence, those of ordinary skill in the art do not equate wood flake or wood strand molding with conventional molding techniques.

Some parts are designed with holes in them for receiving so called "T" nuts. T nuts comprise an annular flange with one or more brads projecting therefrom for anchoring the T nut in the surface of the part, and with an internally threaded sleeve extending perpendicularly from the annular flange. Thus, the hole in the part must extend perpendicularly back from the surface of the part. Such holes may also be required for other purposes.

While such holes can be drilled into a molded wood strand part after it is molded, it would be preferable to mold the holes into the part as part of the molding process. To do so, one provides the mold cavity with a punch projecting from one surface thereof, and a hole defining punch receiving insert in the opposite mold cavity surface, such that as the upper and lower mold halves, or platens, are closed, the punch pushes through the loosely felted mat, pushing wood flakes aside or bending them in the direction of the punch, such that as the binder cures, a hole is formed around the punch.

This technique has worked well where the portion of the part in which the hole is to be formed is oriented generally horizontally in the mold, such that the vertically moving punch pushes straight through the loosely felted mat as the mold closes.

The term "vertically" is used to define the direction of movement of the opening, i.e., the press stroke direction, and "horizontal" as the plane normal thereto. These terms are used for convenience and are not intended to suggest that the mold must be physically oriented such that the mold opening and closing direction is strictly vertical with respect to the earth's surface, though obviously a somewhat vertical mold opening and closing orientation makes it easier to place the loosely felted mat on the top of the bottom mold platen without having it fall off.

In any event, it becomes more difficult to form such holes where they must be formed in a portion of the part which must be oriented at an angle to horizontal in the mold. To move the punch through the felted mat in a direction perpendicular to the part surface would require camming the punch into the mat immediately after the mold is closed, and then camming the punch out of the mat immediately prior to opening the mold. This greatly complicates the mold, and it would be very difficult to push the punch through the compressed mat, even before the binder is cured.

To obviate this difficulty, we have heretofore used a punch having a lopsided funnel shape, with one side of the punch extending generally perpendicular from the mold cavity surface, at a slight draft angle relative to vertical to facilitate withdrawal from the molded part, and the other side of the punch extending downwardly over the hole-forming portion of its length at an angle generally perpendicular to the surface of the part to be formed. Thus, if the part is oriented at about ten degrees (10°) to horizontal in the mold, the angle of this other side of the punch (referred to herein as the "funnel angle") would be about ten degrees (10°) from vertical. This forms a hole which is shaped like a lopsided funnel, but which opens vertically for receiving a T nut or other insert which must extend into the part in a direction perpendicular to the part's surface.

Heretofore, it has been thought impossible to form such a hole where the funnel angle has to be greater than about ten degrees (10°), i.e., where the part is oriented at an angle greater than about ten degrees (10°) to horizontal in the mold. One would expect to have difficulty pushing the punch through the mat at a steep angle to the plane into which the mat is being forced by the mold. Similarly, one would expect the wood flakes to have difficulty moving and bending to accept and conform to the outer shape of the punch.

SUMMARY OF THE INVENTION

In the present invention, it has been surprisingly discovered that molded wood strand products oriented in the mold at angles of twenty degrees or greater to horizontal can be produced with holes which open at least perpendicularly away from the surface of the part, without loss of structural integrity at the point of the recess, utilizing a lopsided funnel-shaped hole punch insert having a funnel angle of twenty degrees or greater to vertical.

These and other features, advantages and objects of the present invention will be further understood and appreciated by those skilled in the art by reference to the following specification and claims.

BRIEF DESCRIPTION OF THE DRAWINGS

FIG. 1 is a side elevation of the lopsided funnel-shaped punch and its punch receiving insert;

FIG. 2 is a front elevation of the punch;

FIG. 3 is a bottom elevational view of the punch;

FIG. 4 is a cross sectional slice taken along plane VI—VI of FIG. 1, and therefore is a plan view of the punch exit hole left in the part, looking downwardly in the press stroke, i.e. vertical, direction. The exit hole appears as an ellipse.

FIG. 5 is a cross sectional slice taken along plane V—V of FIG. 1, and therefore is a plan view of the punch hole looking perpendicularly towards the part surface into which a T nut or the like is to be inserted. The exit hole, viewed from this direction, is a circle.

FIG. 5A is a cross section taken along plane IV—IV of FIG. 1, and therefore is a plan view showing the entry surface of the hole defining portion of the punch looking downwardly and perpendicularly towards the punch hole. The entry surface of the hole defining portion of the punch appears as a slot rounded on each end.

FIG. 7 is the same view of FIG. 6 with the mold closed, whereby the wood strands are consolidated, compressed, and cured under heat and pressure to form the molded wood product.

DETAILED DESCRIPTION OF THE PREFERRED EMBODIMENTS

Figure 6:
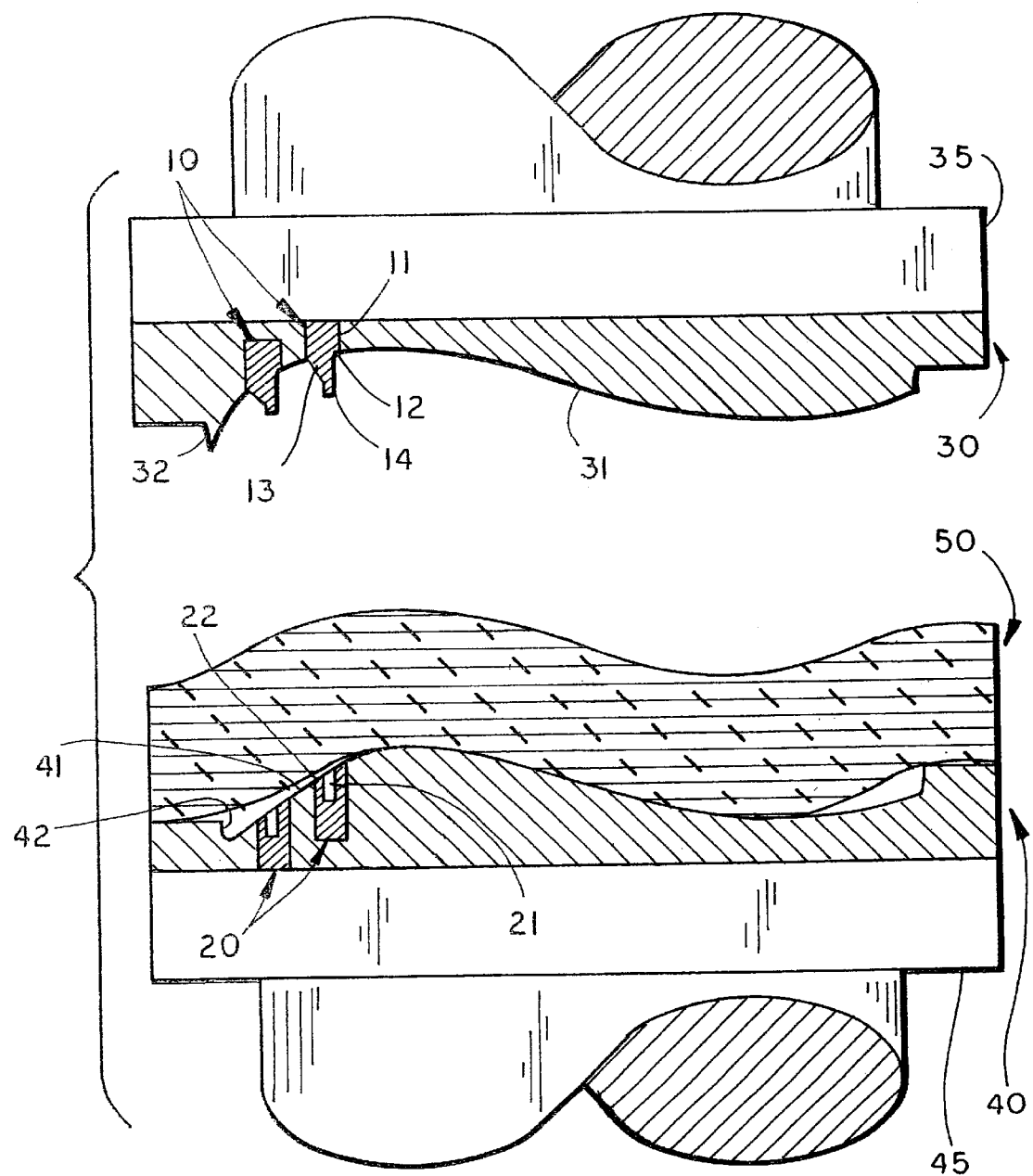
FIG. 6 is a side elevational cross sectional view of the spaced upper and lower mold halves with a loosely felted mat of wood flakes positioned therebetween.

In the preferred embodiment, punches 10 and punch receiving inserts 20 are located in the upper and lower mold halves 30 and 40, respectively (FIG. 6). A loosely felted mat 50 of wood flakes is positioned on lower mold 40 (FIG. 6). When mold parts 30 and 40 are brought together to apply heat and pressure to mat 50, it is compressed and cured into an article of manufacture 50', having holes formed therein by punches 10 passing through mat 50 and forcing wood flakes down into punch receiving inserts 20.

Each punch 10 comprises a base 11 having a base face 12 (FIGS. 1, 2). Base 11 is inserted into a receiving socket in upper mold half 30, as for example by threading into the socket. Base face 12 is then generally aligned with the cavity defining surface 31 of upper mold 30 (FIG. 6).

The lopsided funnel-shaped, hole defining portion 13 of punch 10 projects downwardly from base face 12 (FIGS. 1, 2). Hole defining portion 13 is defined as being a lopsided funnel in configuration, in that, in side elevational view (FIG. 1), it comprises a right side 13a which is generally vertical (actually tapered slightly to create what preferably is about a 3° draft angle A), and a more dramatically angled left side 13b. Projecting downwardly from the hole defining portion 13 is a tip 14 which is generally elliptical in cross section (FIG. 3), and is tapered slightly all the way around to define a draft angle A of approximately 3°.

The angle B which the left side of funnel-shaped hole defining portion 13 makes with respect to the vertical is 20° or greater, and corresponds to the angle C which the surface of the part to be formed (which at this point corresponds to base face 12) makes with respect to the horizontal. Thus if angle C is 32°, angle B will be 32°, so that the hole formed by hole defining portion 13 will extend perpendicularly into the part 50' (FIG. 7) being formed. The width of hole defining portion 13 is sufficiently great throughout its length that it will accommodate the sleeve of a T nut or other item to be inserted into the hole, without interference. The term "vertical" as used herein refers to the press stroke direction, i.e. the direction in which mold halves 30 and 40 open and close. The term "horizontal" then refers to the plane which is perpendicular to the press stroke direction. These terms are not intended to limit the angle of orientation which the mold halves may be placed in during use.

Punch tip 14 extends downwardly from the bottom of hole defining portion 13. Tip 14 is designed to extend downwardly into a punch receiving aperture 21 in punch receiving insert 20, located in bottom mold 40 (FIGS. 1, 6, 7). Punch receiving insert 20 comprises a body which is inserted into and secured in a socket in lower mold 40 in the same manner that base 11 is inserted into and secured in a socket in upper mold 30. In addition to punch tip receiving hole 22, punch receiving insert 20 includes a top face 22 which is intended to align with the part defining surface 41 of bottom mold 40. If the top and bottom surfaces of the part being formed are to be parallel, the angle D which face 22 makes with respect to the horizontal will be equal to angle C.

As can be seen in FIG. 1, the hole 21 in plug receiving insert 20 is somewhat larger than tip 14. This is so that hole 21 will accommodate wood flakes which are pushed downwardly into hole 21 by tip 14 and body defining portion 13 as they pass through loosely felted mat 50. These flakes that are pushed down into hole 21 are referred to as a plug.

When mold halves 30 and 40 are brought together (FIG. 7), it is only tip 14 of punch 10 which projects downwardly into hole 21. The hole defining portion 13 of punch 10 is located in the space between the upper and lower cavity defining surfaces, i.e. the space between base face 12 and insert face 22.

The shape of the exit hole formed by hole defining portion 13 is quite different, depending on which side of the part 50' it is viewed from. When viewed vertically from above, as shown in FIG. 1, the view corresponds to a cross section taken along plane VI—VI of FIG. 1 (FIG. 4). What one sees is an elliptically shaped hole 18. In contrast, if a hole is viewed from the other side of the part, one sees a circle 19, which corresponds to a cross-sectional slice taken along plane V—V at the base of hole defining portion 13 (FIGS. 1, 5). Thus, the entry surface of hole defining portion 13 appears as a slot rounded on each end when looking downwardly and perpendicularly along plane IV—IV of FIG. 1 (FIG. 5A) towards the punch hole.

The resulting hole facilitates the insertion of a T nut from either surface, with its mounting flange and associated bar resting on the surface of the part 50' which has been formed, and with its threaded sleeve projecting inwardly into the hole left by hole defining portion 13.

The funnel angle B of funnel shaped punch hole defining portion 13 (FIG. 1), can be 20 degrees or greater to vertical, and method of production of the present invention includes and contemplates the use of angles substantially greater than 20 degrees to vertical depending on the angle which the surface of the part makes to the horizontal. It is believed that the mold apparatus and method of production of the present invention could produce holes within molded wood strand products at funnel angles of as high as 50 degrees, though the precise upper limit has not been tested.

To produce molded wood strand products, a binder coated wood flake felted mat 50 is placed between top mold 30 and bottom mold 40, overlying the cavity of bottom mold die 40 (FIG. 6). Both top platen 35 and bottom platen 45 are heated, while platens 35 and 45 also apply pressure to mold halves 30 and 40 when engaged against one another in the production of molded wood strand products.

The wood flakes used can be prepared from various species of suitable hardwoods and softwoods used in the manufacture of particleboard. Representative examples of suitable woods include aspen, maple, oak, elm, balsam fir, pine, cedar, spruce, locust, beech, birch and mixtures thereof. Aspen is preferred.

Suitable wood flakes can be prepared by various conventional techniques. Pulpwood grade logs, or so-called round wood, are converted into flakes in one operation with a conventional roundwood flaker. Logging residue or the total tree is first cut into fingerlings in the order of 2–6 inches long with a conventional device, such as the helical comminuting shear disclosed in U.S. Pat. No. 4,053,004, and the fingerlings are flaked in a conventional ring-type flaker.

Roundwood flakes generally are higher quality and produce stronger parts because the lengths and thickness can be more accurately controlled. Also, roundwood flakes tend to be somewhat flatter, which facilitates more efficient blending and the logs can be debarked prior to flaking which reduces the amount of less desirable fines produced during flaking and handling. Acceptable flakes can be prepared by ring flaking fingerlings and this technique is more readily adaptable to accept wood in poorer form, thereby permitting more complete utilization of certain types of residue and surplus woods.

Irrespective of the particular technique employed for preparing the flakes, the size distribution of the flakes is quite important, particularly the length and thickness. The wood flakes should have an average length of about 1¼ inch to about 6 inches and an average thickness of about 0.005 to about 0.075 inches. The average length of the wood flakes is preferably about 2 to about 3 inches. In any given batch, some of the flakes can be shorter than 1¼ inch, and some can be longer than 6 inches, so long as the overall average length is within the above range. The same is true for the thickness.

The presence of major quantities of flakes having a length shorter than about 1¼ inch tends to cause the mat to pull apart during the molding step. The presence of some fines in the mat produces a smoother surface and, thus, may be desirable for some applications so long as the majority of the wood flakes, preferably at least 75%, is longer than 1⅛ inch and the overall average length is at least 1¼ inch.

Substantial quantities of flakes having a thickness of less than about 0.005 inches should be avoided, because excessive amounts of binder are required to obtain adequate bonding. On the other hand, flakes having a thickness greater than about 0.075 inch are relatively stiff and tend to overlie each other at some incline when formed into the mat. Consequently, excessively high mold pressures are required to compress the flakes into the desired intimate contact with each other. For flakes having a thickness falling within the above range, thinner ones produce a smoother surface while thick ones require less binder. These two factors are balanced against each other for selecting the best average thickness for any particular application. The average thickness of the flakes preferably is about 0.015 to about 0.25 inches, and more preferably about 0.0020 inch.

The width of the flakes is less important. The flakes should be wide enough to ensure that they lie substantially flat when felted during mat formation. The average width generally should be about 3 inches or less and no greater than the average length. For best results, the majority of the flakes should have a width of about 1/16 inch to about 3 inches, and preferably 0.25 to 1.0 inches.

The blade setting on the flaker can primarily control the thickness of the flakes. The length and width of the flakes are also controlled to a large degree by the flaking operation. For example, when the flakes are being prepared by ring flaking fingerlings, the length of the fingerlings generally sets the maximum lengths. Other factors, such as the moisture content of the wood and the amount of bark on the wood affect the amount of fines produced during flaking. Dry wood is more brittle and tends to produce more fines. Bark has a tendency to more readily break down into fines during flaking and subsequent handling than wood.

While the flake size can be controlled to a large degree during the flaking operation as described above, it usually is necessary to use some sort of classification in order to remove undesired particles, both undersized and oversized, and thereby ensure the average length, thickness and width of the flakes are within the desired ranges. When roundwood flaking is used, both screen and air classification usually are required to adequately remove both the undersize and oversize particles, whereas fingerling flakes usually can be properly sized with only screen classification.

Flakes from some green wood can contain up to 90% moisture. The moisture content of the mat must be substantially less for molding as discussed below. Also, wet flakes tend to stick together and complicate classification and handling prior to blending. Accordingly, the flakes are preferably dried prior to classification in a conventional type drier, such as a tunnel drier, to the moisture content desired for the blending step. The moisture content to which the flakes are dried usually is in the order of about 6 weight % or less, preferably about 2 to about 5 weight %, based on the dry weight of the flakes. If desired, the flakes can be dried to a moisture content in the order of 10 to 25 weight % prior to classification and then dried to the desired moisture content for blending after classification. This two-step drying may reduce the overall energy requirements for drying flakes prepared from green woods in a manner producing substantial quantities of particles which must be removed during classification and, thus, need not be as thoroughly dried.

To coat the wood flakes prior to being placed as a felted mat 50 within the cavity of bottom mold 40 within mold apparatus of the preferred embodiment, a known amount of the dried, classified flakes is introduced into a conventional blender, such as a paddle-type batch blender, wherein predetermined amounts of a resinous particle binder, and optionally a wax and other additives, is applied to the flakes as they are tumbled or agitated in the blender. Suitable binders include those used in the manufacture of particle board and similar pressed fibrous products and, thus, are badly referred to herein as "resinous particle board binders." Representative examples of suitable binders include thermosetting resins such as phenolformaldehyde, resorcinol-formaldehyde, melamine-formaldehyde, urea-formaldehyde, urea-furfuryl and condensed furfuryl alcohol resins, and organic polyisocyantes, either alone or combined with urea- or melamine-formaldehyde resins.

Particularly suitable polyisocyanates are those containing at least two active isocyanate groups per molecule, including diphenylmethane diisocyanates, m- and p-phenylene diisocyanates, chlorophenylene diisocyanates, toluene di- and triisocyanates, triphenylmethene triisocyanates, diphenylether-2,4,4'-triisoccyanate and polyphenylpolyisocyanates, particularly diphenylmethane-4,4'-diisocyanate. So-called MDI is particularly preferred.

The amount of binder added to the flakes during the blending step depends primarily upon the specific binder used, size, moisture content and type of the flakes, and the desired characteristics of the part being formed. Generally, the amount of binder added to the flakes is about 2 to about 15 weight %, preferably about 4 to about 10 weight %, as solids based on the dry weight of the flakes. When a polyisocyanate is used alone or in combination with a urea-formaldehyde resin, the amounts can be more toward the lower ends of these ranges.

The binder can be admixed with the flakes in either dry or liquid form. To maximize coverage of the flakes, the binder preferably is applied by spraying droplets of the binder in liquid form onto the flakes as they are being tumbled or agitated in the blender. When polyisocyantes are used, a conventional mold release agent preferably is applied to the die or to the surface of the felted mat prior to pressing. To improve water resistance of the part, a conventional liquid wax emulsion preferably is also sprayed on the flakes during the blinding step. The amount of wax added generally is about 0.5 to about 2 weight %, as solids based on the dry weight of the flakes. Other additives, such as at least one of the following: a coloring agent, fire retardant, insecticide, fungicide, mixtures thereof and the like may also be added to the flakes during the blending step. The binder, wax and other additives, can be added separately in any sequence or in combined form.

The moistened mixture of binder, wax and flakes or "furnish" from the blending step is formed into a loosely-felted, layered mat 50, which is placed within the cavity of bottom mold 40 prior to the molding and curing of the mat into a molded wood particle product. The moisture content of the flakes should be controlled within certain limits so as to obtain adequate coating by the binder during the blending step and to enhance binder curing and deformation of the flakes during molding.

The presence of moisture in the flakes facilitates their bending to make intimate contact with each other and enhances uniform heat transfer throughout the mat 50 during the molding step, thereby ensuring uniform curing. However, excessive amounts of water tend to degrade some binders, particularly urea-formaldehyde resins, and generate steam which can cause blisters. On the other hand, if the flakes are too dry, they tend to absorb excessive amounts of the binder, leaving an insufficient amount on the surface to obtain good bonding and the surfaces tend to cause hardening which inhibits the desired chemical reaction between the binder and cellulose in the wood. This latter condition is particularly true for polyisocyanate binders.

Generally, the moisture content of the furnish after completion of blending, including the original moisture content of the flakes and the moisture added during blending with the binder, wax and other additives, should be about 5 to about 25 weight %, preferably about 8 to about 12 weight %. Generally, higher moisture contents within these ranges can be used for polyisocyanate binders because they do not produce condensation products upon reacting with cellulose in the wood.

The furnish is formed into a generally flat, loosely-felted, mat, preferably as multiple layers. A conventional dispensing system, similar to those disclosed in U.S. Pat. Nos. 3,391,223 and 3,824,058, and 4,469,216 can be used to form the mat. Generally, such a dispensing system includes trays, each having one open side, carried on an endless belt or conveyor and one or more (e.g., 3) hoppers spaced above and along the belt in the direction of travel for receiving the furnish.

When a multi-layered mat is formed in accordance with a preferred embodiment, a plurality of hoppers usually are used with each having a dispensing or forming head extending across the width of the carriage for successively depositing a separate layer of the furnish as the tray is moved beneath the forming heads. Following this, the tray is taken to the mold to place the felted mat 50 within the cavity of bottom mold 40, by sliding the tray out from under mat 50.

In order to produce molded wood strand products having the desired edge density characteristics without excessive blistering and springback, the felted mat 50 should preferably have a substantially uniform thickness and the flakes should lie substantially flat in a horizontal plane parallel to the surface of the carriage and be randomly oriented relative to each other in that plane. The uniformity of the mat thickness can be controlled by depositing two or more layers of the furnish on the carriage and metering the flow of furnish from the forming heads.

Spacing the forming heads above the carriage so the flakes must drop about 1 to about 3 feet from the heads en route to the carriage can enhance the desired random orientation of the flakes. As the flat flakes fall from that height, they tend to spiral downwardly and land generally flat in a random pattern. Wider flakes within the range discussed above enhance this action. A scalper or similar device spaced above the carriage can be used to ensure uniform thickness or depth of the mat, however, such means usually tend to align the top layer of flakes, i.e., eliminate the desired random orientation. Accordingly, the thickness of the mat preferably is controlled by closely metering the flow of furnish from the forming heads.

The mat thickness used will vary depending upon such factors as the size and shape of the wood flakes, the particular technique used for forming the mat, the desired thickness and density of the mold wood product produced, the configuration of the molded wood product, and the molding pressure to be used.

Following the production of the felted mat 50 and placement of the mat within the cavity of bottom mold 40, mat 50 is compressed and cured under heat and pressure when top mold 30 engages bottom mold 40 (FIG. 8). During this molding process, punch 10 attached to and projects from top mold 30 pushes through binder coated wood flakes of felted mat 9 forms a hole at an angle of 20 degrees or greater to vertical while its tip 14 is received by hole punch aperture 21 in punch receiving insert 20.

Felted mat 50 is then compressed and cured between top mold 30 and bottom mold 40 to become molded wood strand part 50. After molded wood strand part 50' is produced by the method of the present invention, any flashing and any plugs are removed by conventional means to reveal molded hole or holes, depending upon the number of hole punches used during the molding process, having angles of 20 degrees or greater to vertical. Such molded holes 12 are capable of receiving insertion material, such as T nuts, in an assembly-line like fashion.

Thus, molded holes having angles 20 degrees or greater can be produced for a multitude of inserts, such as T nuts, having a variety of shapes and sizes, which could not have been done previously. In addition, the placement of such inserts within molded wood strand parts in an assembly-like fashion improves production efficiency and reduces cost in producing such parts, which could not be done previously as well.

The above description is that of the preferred embodiments only. Modifications of the invention will occur to those skilled in the art and to those who make or use the invention. Therefore, it is understood that the embodiment described above is merely for illustrative purposes and not intended to limit the scope of the invention, which is defined by the following claims as interpreted according to the principles of patent law, including the Doctrine of Equivalents.

The invention claimed is:

1. A method of molding an article formed from wood flakes comprising:

forming a loosely felted mat of said wood flakes;

depositing said mat onto a lower mold die;

compressing and heating said mat between an upper mold die and said lower mold die, said upper and lower mold dies forming a part defining mold cavity therebetween;

providing a punch having a lopsided funnel-shaped hole defining portion projecting from the cavity defining surface of said upper mold die, wherein said funnel shaped portion has a funnel angle of approximately 20 degrees or greater with respect to the stroke direction of the upper and lower mold dies; and providing said lower mold die with a punch receiving aperture into which wood flakes are pressed by said punch.

2. The method of claim 1, wherein said wood flakes have an average length of from about 1¼ to about 6 inches, an average thickness of from about 0.015 to about 0.25 inches, and an average width of less than the average length, and no greater than about 3 inches.

3. The method of claim 2, wherein said wood flakes of said mat have an average length of from about 2 to about 6 inches.

4. The method of claim 3, wherein said wood flakes of said mat have an average thickness of from about 0.015 to about 0.030 inches.

5. The method of claim 4, wherein said wood flakes of said mat have an average width of from about 0.25 to about 1.0 inches.

6. The method of claim 2, wherein said funnel angle is located on one side of said hole defining portion of said punch, and the opposite side of said punch is tapered only slightly with respect to the punch stroke direction to create a slight draft angle.

7. The method of claim 6, in which said punch includes a tip projecting downwardly from said hole defining portion, such that it extends into said punch receiving aperture.

8. The method of claim 1, wherein said funnel angle is located on one side of said hole defining portion of said punch, and the opposite side of said punch is tapered only slightly with respect to the punch stroke direction to create a slight draft angle.

9. The method of claim 8, in which said punch includes a tip projecting downwardly from said hole defining portion, such that it extends into said punch receiving aperture.

10. The method of claim 1, in which said punch includes a tip projecting downwardly from said hole defining portion, such that it extends into said punch receiving aperture.

* * * * *